Nov. 20, 1928.

H. H. WANDERS

PACKAGING MACHINE

Original Filed Feb. 14. 1922      9 Sheets-Sheet 3

Inventor
Hans H. Wanders
Att'ys

Nov. 20, 1928.

H. H. WANDERS

PACKAGING MACHINE

Original Filed Feb. 14, 1922   9 Sheets-Sheet 4

1,692,429

Inventor
Hans H. Wanders

Nov. 20, 1928.  
H. H. WANDERS  
1,692,429  
PACKAGING MACHINE  
Original Filed Feb. 14, 1922   9 Sheets-Sheet 6

Nov. 20, 1928.

H. H. WANDERS

PACKAGING MACHINE

Original Filed Feb. 14, 1922   9 Sheets—Sheet 9

1,692,429

Inventor
Hans H. Wanders

Patented Nov. 20, 1928.

1,692,429

UNITED STATES PATENT OFFICE.

HANS H. WANDERS, OF BOSTON, MASSACHUSETTS.

PACKAGING MACHINE.

Application filed February 14, 1922 Serial No. 536,523. Renewed April 21, 1928.

This invention relates to packaging machines and is designed to supply measured quantities of fluent material such as powder to receptacles each formed from a single blank of sheet material such as paper which is automatically closed and sealed and ejected from the machine.

The blanks for forming the packages are punched out in the form of disks from a strip, formed to receive the material by crimping the marginal portion, filled and closed by folding down the crimped portion against the material, and an adhesive disk or wafer is punched out and the punching is presented to the package to seal it, a subsequent pressing operation being effected for insuring an effective seal. Each of these operations is performed simultaneously on different packages or blanks. The form of package made by this machine is also believed to be new.

For a more complete understanding of this invention together with further novel features and advantageous details and combinations of parts, reference may be had to the accompanying drawings in which

Figures 18 and 19 are plan and edge elevations, respectively, of a package blank.

Figures 5, 6, 7:
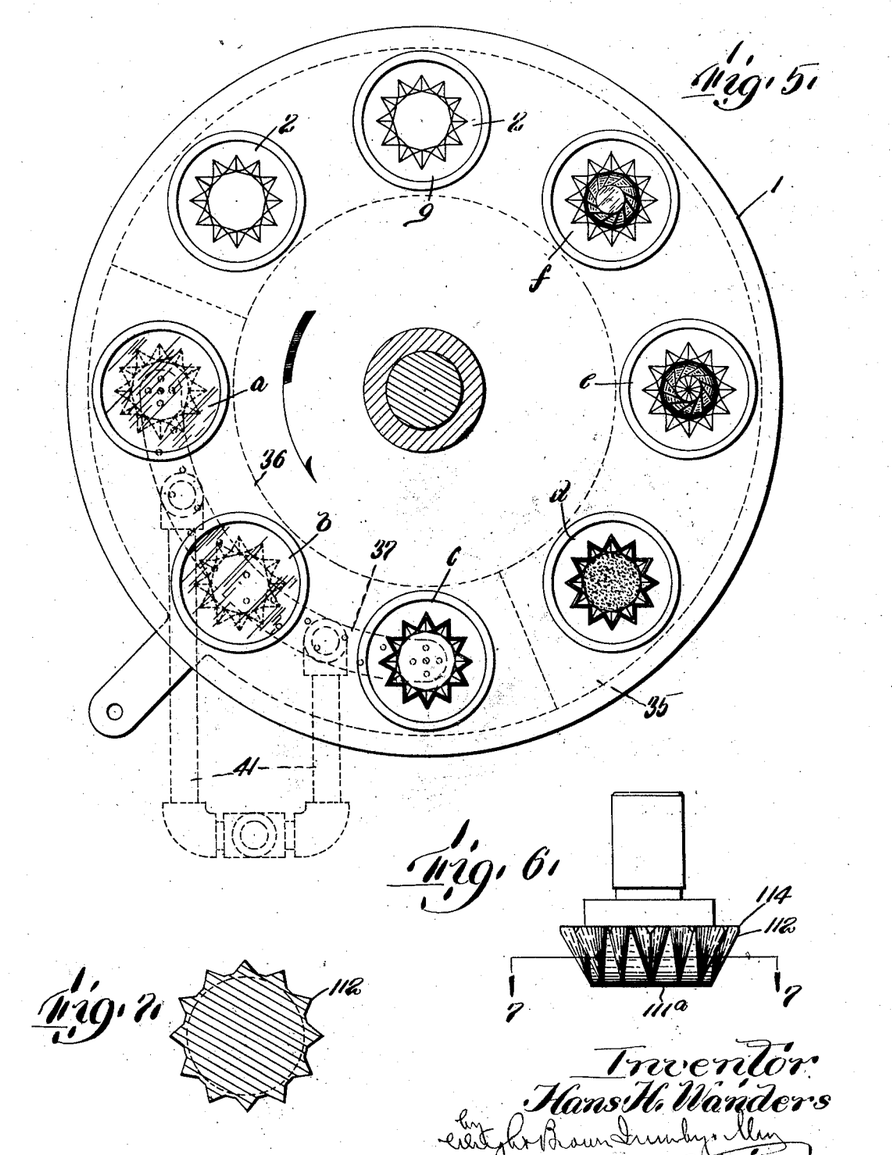
Figure 5 is a horizontal section looking down on the table of the machine, parts being removed to show the locations of the various operating stations.
Figure 6 is a side elevation of a crimping die.
Figure 7 is a section on line 7—7 of Figure 6.

The machine in general comprises a rotary table which is shown best in plan view in Figure 5 and indicated at 1. This table has a series of die openings 2 therein spaced about adjacent the margin thereof which are designed to be moved by an intermittent rotation of the table to present female dies 45 therein in sequence to various operating stations in which the various operations for forming, filling, closing and sealing the package are performed. In the present embodiment eight dies are shown and there are six operating stations, two positions of each die in the rotation of the table being idle as will later be described.

Figure 4:
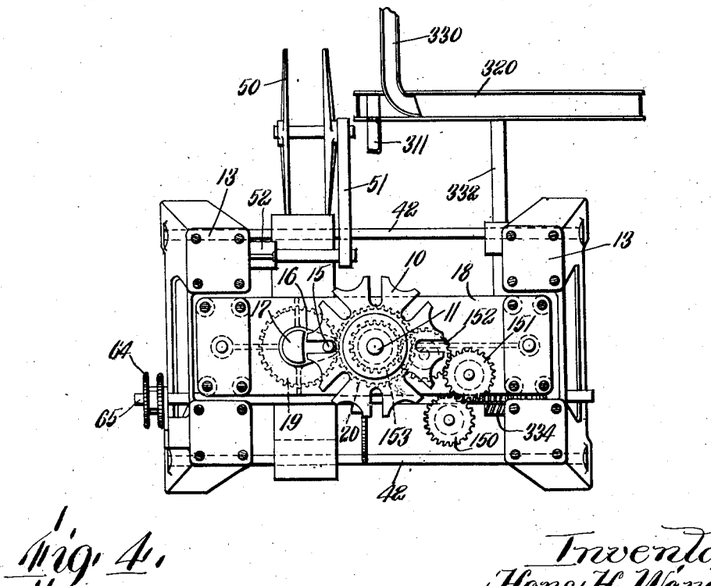

For the purpose of imparting the intermittent or step by step rotation to the table 1 this table has fixed to rotate therewith a Geneva wheel 10 best shown in Figure 4, both wheel and table being journaled on the vertical shaft 11. This shaft 11 is substantially central of the machine frame 12 which is supported in elevated position by a series of standards 13 to provide space for mechanisms beneath the table as will be later described. The Geneva wheel 10 is given a step by step movement from a crank pin 15 (see Figure 4) on a crank arm 16 made fast to the upper end of a vertical shaft 17 which is journaled in a cross frame member 18. Beneath this frame member the shaft 17 has fixed thereto a gear 19 which meshes with a similar gear 20 fixed to the lower end of the shaft 11. This shaft, also journaled in the frame member 18, extends upwardly through the table and is journaled near its upper end in a cross frame member 21 near the upper end of the machine. At its upper end this shaft has fixed thereto a bevel gear 22 meshing with a similar gear 23 fixed to a horizontal shaft 24. The shaft 24 is journaled adjacent opposite ends in bearing boxes 25 and 26 at the upper ends of standards 27 fixed to the upper face of the machine frame 12 and are on diametrically opposite sides of the table 1. The shaft 24 is the main drive shaft of the machine and outwardly of one of the frame members 27 carries fast and loose pulleys 28 and 29. Rotation of the shaft 24 rotates the vertical shaft 11 through the gears 23 and 22 and through the gears 20 and 19 rotates the crank shaft 17 to impart the desired motion to the table 1 through the Geneva mechanism.

The table 1 rests on a ring member 35 which is shown in dotted lines in Figure 5. This ring member is preferably made in two sections, the shorter of which, indicated at 36, has an arc shaped recess 37 in its under side as shown more particularly in Figures 5 and 8, and at intervals, this recess communicates through openings 38 with the top face of the ring. The ring is stationary and forms a base for the series of dies 45 during their movement, this ring being supported from a portion of the machine frame shown at 40 so that the recess 37 forms a conduit opening upwardly to the dies through the apertures 38. This recess 37 communicates with an exhaust pipe 41 shown in dotted lines in Figure 5, which leads to an exhaust pump 41 made fast to a cross frame member 42 positioned at the lower portion of the machine, this mechanism being for a purpose which will later be described.

Figure 8:
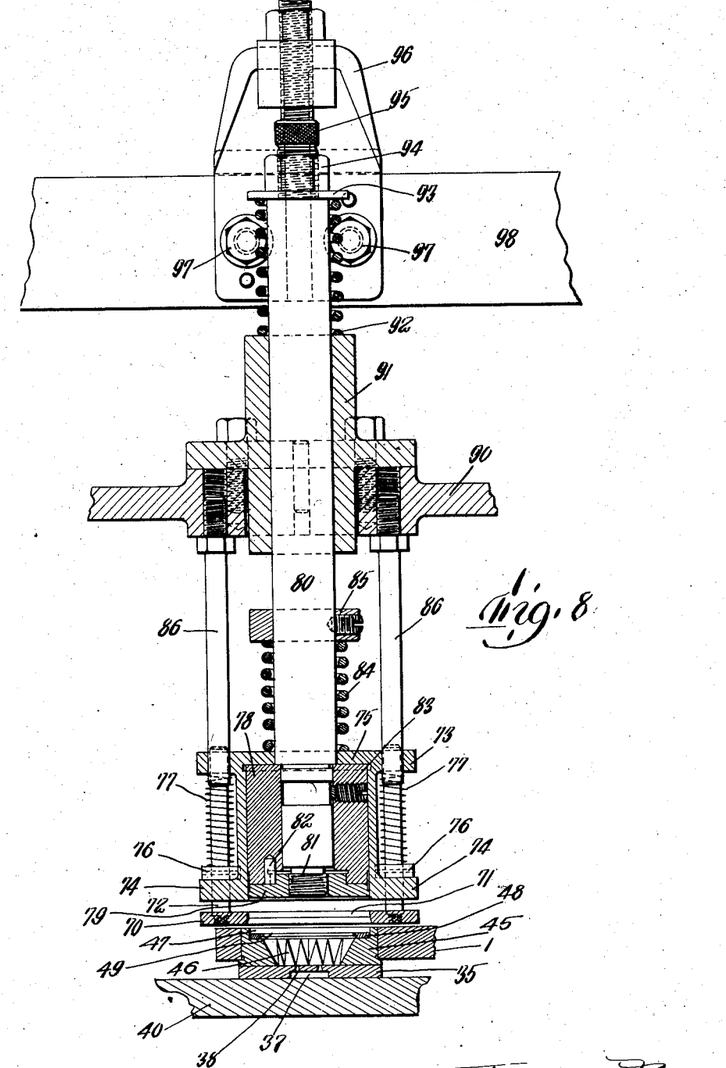
Figure 8 is a vertical section through the package blanking mechanism.
Figures 9, 10, 11:
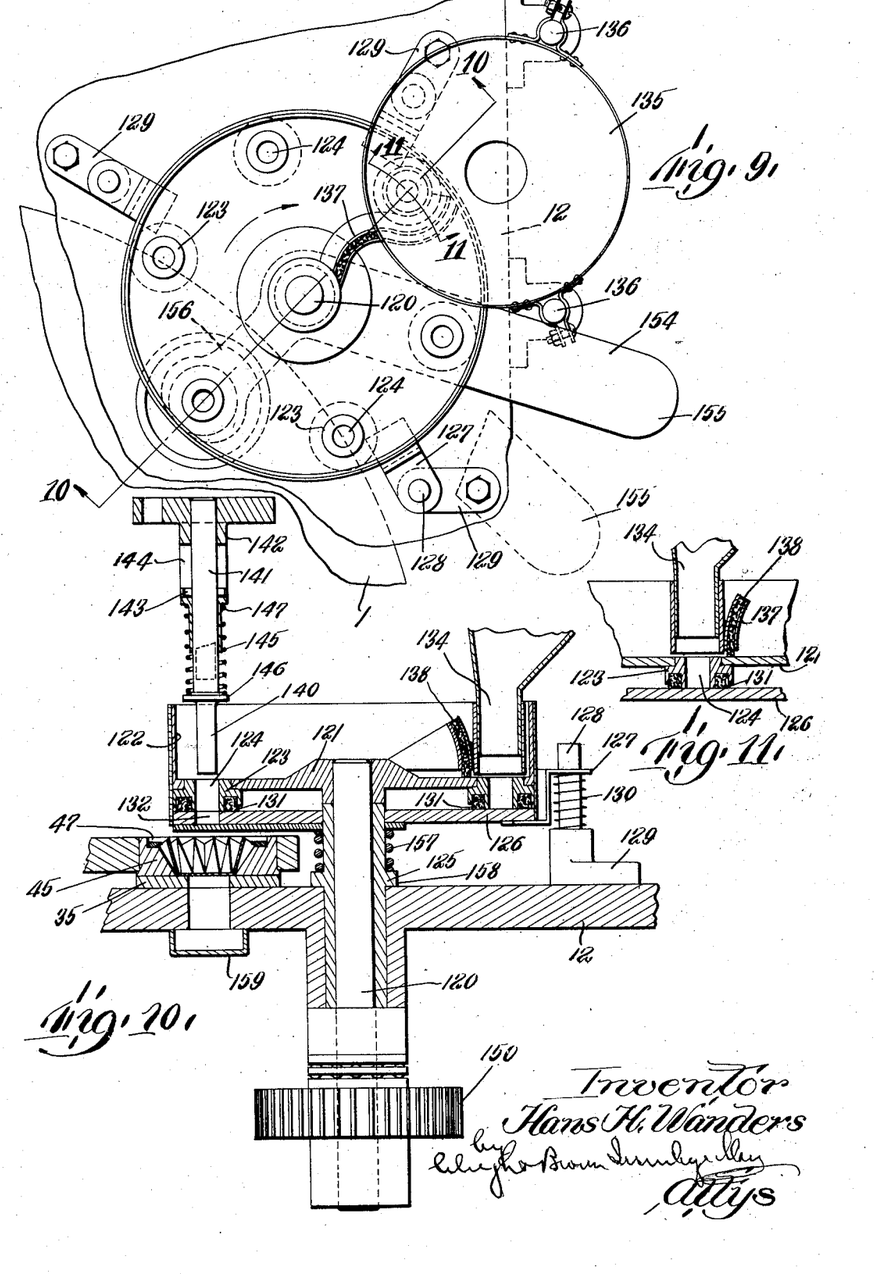
Figure 9 is a fragmentary plan of the filling mechanism.
Figures 10 and 11 are sections on lines 10—10 and 11—11, respectively, of Figure 9.
Figures 12, 13:
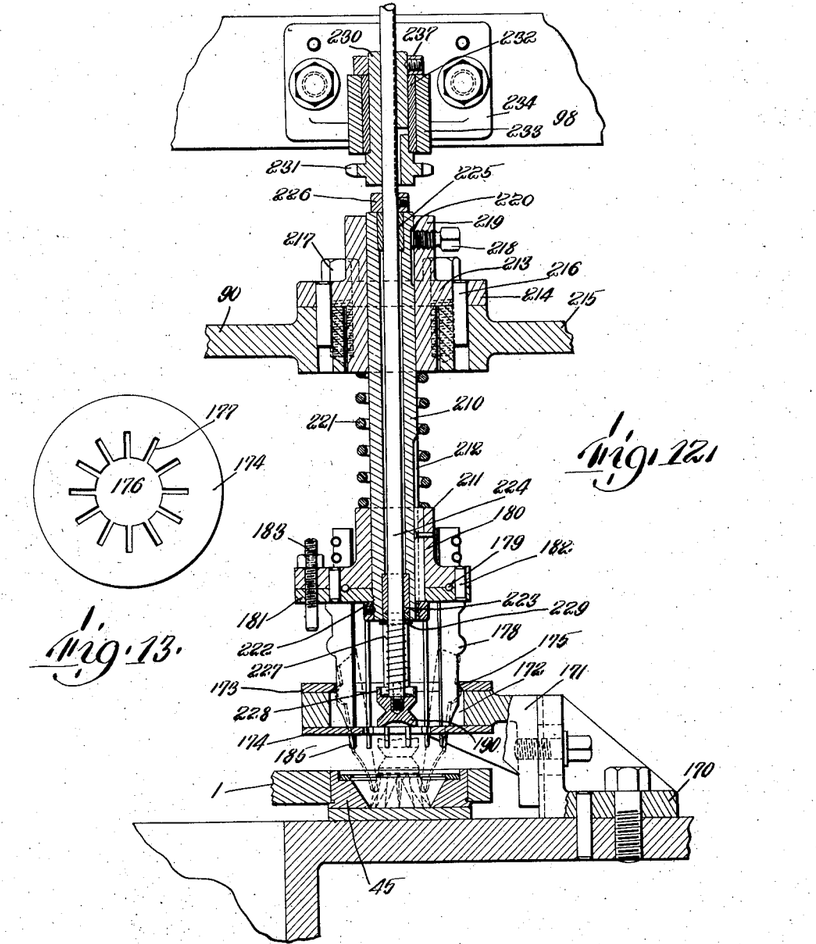
Figure 12 is a fragmentary vertical section through the package closing mechanism.
Figure 13 is a detail plan of one element of this mechanism.

As shown more particularly in Figures 8, 10 and 12, each die block 45 is formed with inwardly and downwardly inclined side wall rib portions 46 and has at its upper end a counterbored portion 47. Within this counterbored portion is pressed a ring 48 which has at its upper face an inwardly extending flange 49 for a purpose which will presently appear.

Figure 2:
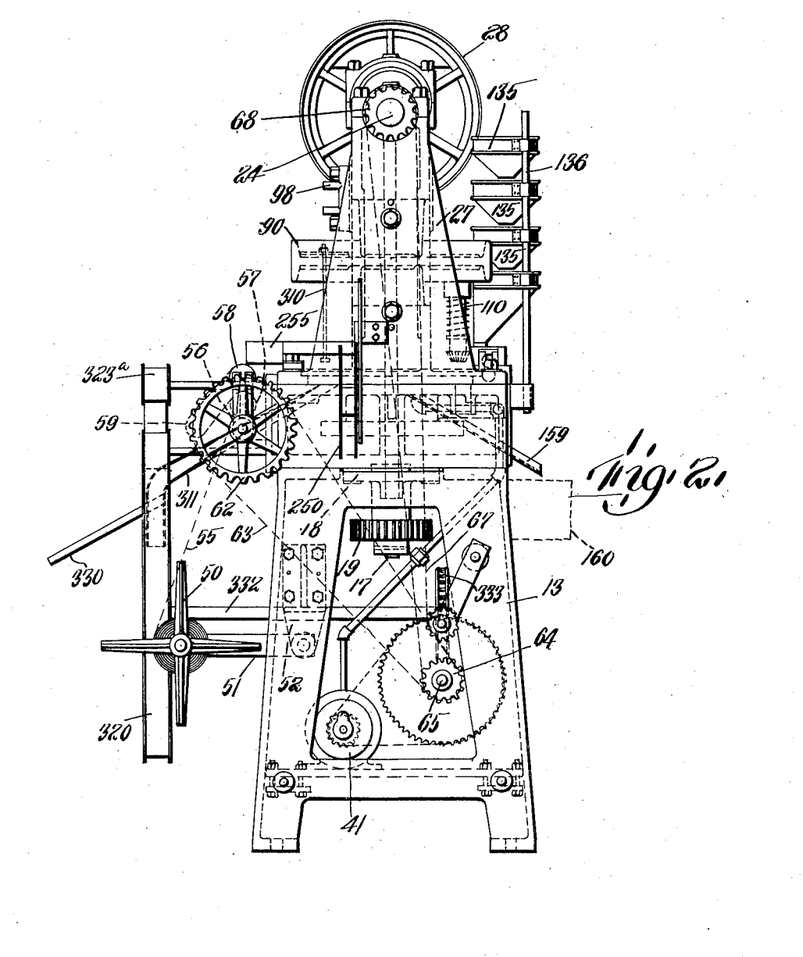
Figure 2 is a left side elevation.
Figure 3:
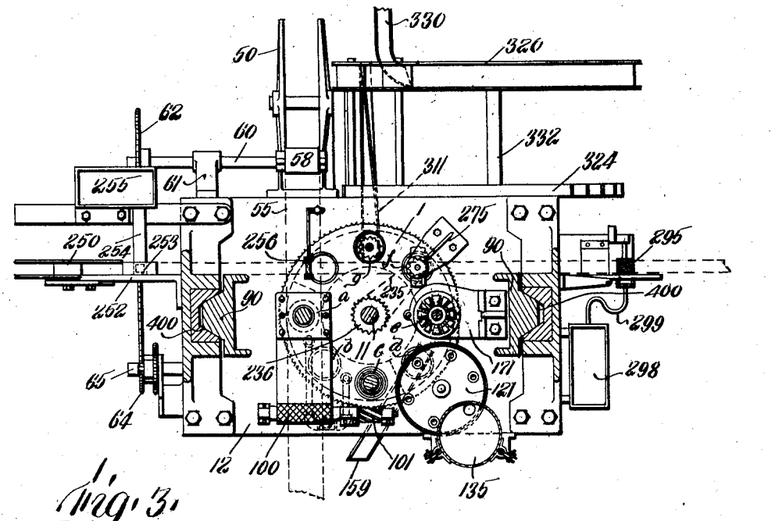
Figures 3 and 4 are sections on lines 3—3 and 4—4, respectively, of Figure 1.

The sheet material from which the packages are to be made may, if desired, be a paper strip, and is supported in the machine frame on a reel shown at 50 in Figures 2, 3, and 4, this reel being carried at the outer end of an arm 51 extending outwardly from a bracket 52 fixed to one of the standards 13. The strip passes upwardly from the reel as shown in dotted lines in Figure 2 at 55 and between a pair of feed rolls 56 and 57, over the roll 57, between it and a third roll 58, and then over the top of roll 58, the strip being preferably slack to form a loop at 59 after passing between the feed rolls 57 and 58. One of these feed rolls is preferably driven, the roll 56 being so shown in Figure 2. For this purpose the roll 56 is fixed to a shaft 60 (see Figure 3) which is journaled in a bearing bracket 61 extending outwardly from the machine frame and carries at its outer end a sprocket wheel 62. Passing over this sprocket wheel is a chain indicated at 63 (Figure 2) which passes over a smaller sprocket wheel 64 fixed to the end of a horizontal shaft 65 at the lower part of the machine. This shaft 65 also has fixed thereon a sprocket wheel 66 over which engages a chain 67 which extends upwardly and over a sprocket wheel 68 fixed to the end of the drive shaft 24. By this means a constant feed of the paper from the reel is produced, the loop 59 being employed to permit a step by step feed of the strip to mechanisms for punching blanks therefrom for the formation of the packages.

*Blank forming mechanism.*

The punching mechanism is shown in detail in Figure 8. Referring to this figure at 70 is indicated a die plate having a hole or opening 71 therethrough of the size desired for the package blank and over which the strip from the reel is passed. This die plate has fixed thereto a series of upstanding guide pins 72 which pass through openings in upper and lower guide flanges 73 and 74 of a plunger block 75. Above the lower flange 74, each guide pin 72 has fixed thereon a collar 76 and positioned about each pin and bearing at opposite ends against the collar and the under face of the flange 73 is a coil spring 77. These springs normally urge collars 76 into engagement with the lower flanges 74 so as to position the die plate 70 at a slight distance from the lower face of the block 75 to permit the paper strip to pass therebetween. The block 75 is formed with a cylindrical recess for the reception of a punch block 78 which is slidable therein and to the lower end of which may be fixed a cutting plate 79 which cooperates with the opening 71 of the die plate to punch out disks from the strip. The punch block 78 and the plate 79 are carried at the lower end of a plunger bar 80 which has its lower end reduced and threaded as shown at 81 to engage a mating threaded opening in the punch plate 79. A pin 82 extends upwardly from this punch plate into the block 78 to prevent relative rotation between the plate and block and the bar 80 may be fixed relative to the block 78 by means of a set screw 83 extending through the side wall of the block and engaging in a reduced portion in the bar 80. The block 75 is supported on the block 78 when the die plate 70 is raised up from the table 1. In order to clamp the strip between the block 75 and the plate 70 a coil spring 84 is interposed between the upper face of the block 75 and a collar 85 fixed to the bar 80. This spring has sufficient strength to overcome the springs 76 so that on depression of the bar 80 the die plate 70 impinges on the table 1 above a die 45 and the block 75 is brought down firmly against the strip so that further motion of the bar 80 then causes the punch block 78 and the plate 79 to move out from the block 75 to punch the strip and project the punching through the die plate and into the die 45 held by the table. The block 75 is guided in its movement by means of guide pins 86 passing through mating perforations in the upper flanges 73 and fixed at their upper ends in a crosshead 90. This crosshead has a sleeve portion 91 through which the bar 80 is slidable and on depression of this crosshead the lower end of the sleeve impinges on the collar 85 to impart downward motion to the bar. The crosshead 90 is also used to impart the operative movements to the package forming, closing, and sealing mechanisms as will be described.

In order to raise the bar to return the parts to inoperative position, a coil spring 92 surrounding this bar bears at its lower end against the upper end of the sleeve 91 and at its upper end beneath a collar 93 made fast to the upper end of the bar by means of a cap screw 94 inserted therein. In order to regulate the extent to which the bar may be raised and consequently the upper limit of movement of the punch, a stop screw 95 having a knurled head is threaded in a bracket 96 which is bolted by bolts 97 to a cross frame member 98 extending between the bracket members 27.

The punching mechanism is located in the station indicated at $a$ in Figures 3 and 5 and it will be noted that it is positioned above the portion 36 of the ring member with which communicates the exhaust pump 41. This exhaust pump causes a partial vacuum to be maintained within the die block 45 beneath the disk and holds it positioned in the die until the blank is formed into the receptacle, at which time its use is not necessary. The strip from which the blank has been cut after passing across the station at $a$, as shown in dotted lines in Figure 3, passes between a pair of feed rolls 100 shown in Figures 1 and 3. The lower feed roll 100 is fixed on a shaft on one end of which is a worm 101 (see Figure 3) of steep pitch, which is driven by teeth cut on the outer periphery of the table 1. Since this table is given an intermittent motion by the Geneva mechanism above described, the feed rolls 100 are also intermittently rotated to give the required step by step movement of the strip through the punching mechanism.

From the position $a$ of Figure 5 the die block 45 having a blank therein is moved in the direction of the arrow to the position $b$. This is an idle position since the die member is then positioned somewhat beneath the strip of sheet material from which the blanks are punched (as indicated in Figure 3) so that this would interfere with an operation at that point.

Receptacle forming mechanism.

Figure 1:
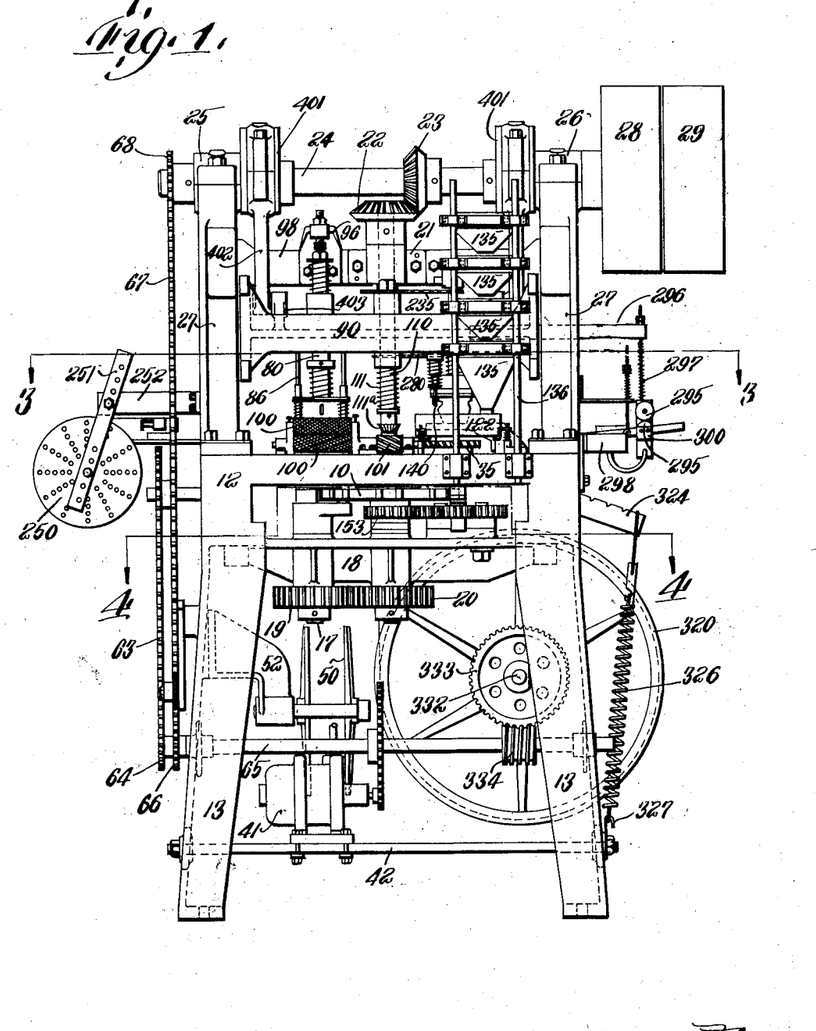
Figure 1 is a front elevation of the machine.
Figure 20:
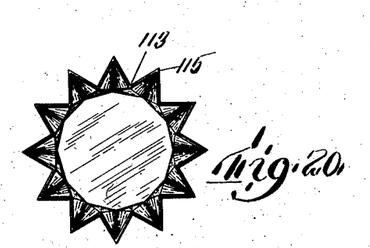
Figures 20 and 21 are similar views showing the blank formed to receive the filling.
Figure 21:
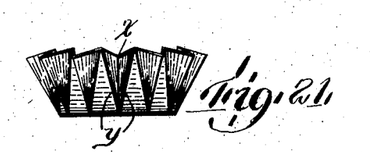
Figure 22:
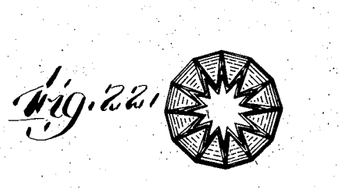

The next position to which the die is moved is shown at $c$ at which place the blank is formed into a receptacle for receiving the filling. In vertical alinement with this position the crosshead 90, as shown in Figure 1, carries a plunger 110, a spring 111 being employed through which the motion of the crosshead is imparted thereto. This plunger is shown in detail in Figures 6 and 7 and has at its lower end a head 111$^a$ having a series of tapered angular projections 112 extending outwardly therefrom and positioned to engage in mating grooves in each of the die blocks carried by the table. When this plunger descends into the die block the marginal portions of the disk are folded alternately in opposite directions as shown in Figures 20 and 21 to form a receptacle having a zigzag side wall having a series of reentrant angle portions 113 formed by a series of outwardly facing radial folds $x$ and inwardly facing folds $y$ extending on each side from the inner end of each radial fold to points midway between the outer ends of the radial folds. The upper ends of the projections 112 are cut away at 114 to clear the flange 49 of the ring member 48. These parts are so related to the diameter of the blank that the upper edges of the outwardly extending folded portions 115 (see Figure 20) of the receptacle extend beneath the flange 49 in the manner shown in Figure 14 so that on retraction of the plunger 111$^a$ from the die the blank now formed into a receptacle will be retained therein. After this operation therefore it is unnecessary to subject the blanks to the action of the exhaust pump 41 and this station therefore is the last in the series which communicates with the section 36 of the ring 35.

Filling mechanism.

After the blank is so formed into a receptacle it moves on to the station shown at $d$ in which the material to be packaged is fed thereto. The mechanism for supplying the material is indicated generally in Figures 1, 2, 3, and in detail in Figures 9, 10, and 11.

Referring to Figures 9, 10, and 11 at 120 is shown a vertical shaft journaled in the machine frame and having at its upper end a disk 121 having a marginal upwardly extending flange 122. This disk is perforated and at each perforation is inserted a block 123 having a central perforation 124 therethrough. Blocks having various sized perforations may be inserted interchangeably in the openings in the disk 121, the volume of the perforation 124 between the ends of the block determining the amount of material to be fed in making each package. The shaft 120 passes through a bushing 125 and slidable on this bushing beneath the plate 121 is a plate 126 having a marginal upwardly extending flange enclosing the flange 122. Positioned about the circumference of this plate are outwardly and upwardly extending bracket arms 127 through which are passed guide pins 128 upstanding from brackets 129 fixed to the machine frame. Positioned around each pin 128 between the upper face of the bracket 129 and the member 127 is a spring 130, these springs acting together to press the plate 126 upwardly toward the plate 121 and into engagement with the lower faces of the measuring blocks 123. It is preferable to interpose packing rings 131 between the lower ends of the blocks 123 and the plate 126 to prevent leakage of material therebetween. The plate 126 is held from rotation with the plate 121 by means of its engagement with the pins 128 and at one portion thereof it is provided with an opening 132 with which the perforations 124 of the blocks 123 may be brought serially into alinement. This opening 132 is positioned above the die 45 at the station $d$ so as to furnish a discharge opening for each measuring block when a package receptacle is positioned therebeneath. The material to be packaged is fed into the feed receptacle formed by the plate 121 and its flange 122 through a spout shown at 134 which leads from any suitable form of storage container, herein shown as a series of superposed hoppers 135 which are supported from the machine frame by means of vertical rods 136 to which these hoppers may be clamped as shown more particularly in Figures 1 and 2. The spout 134 discharges in alinement with the path of motion of the measuring blocks and in order that the proper amount of material may be placed therein a wiper mechanism for striking off the material extending above the upper ends of the blocks is provided. Such mechanism as shown comprises a curved arm 137 extending outwardly from a centrally raised portion of the plate 121 and curving about the lower end of the chute in advance thereof in the direction of rotation of the plate. This arm 137 is formed with double walls to receive therebetween material such as felt 138 which closely engages the upper face of the plate 121 and the upper ends of the measuring blocks.

The feed receptacle is rotated to bring a measuring block in alinement with the opening 132 whenever the table 1 is moved to position a package receptacle therebeneath, whereupon means is provided for ejecting the material from the measuring block. This means as shown in Figure 10 comprises a plunger 140 having its lower end formed to project within the perforation of the measuring block and having a stem 141 slidable within a sleeve 142 carried by the crosshead 90. The ejector is retained within the sleeve by means of a pin 143 extending transversely thereof and riding in a slot 144 in the sleeve. It is normally held at its downward limit of motion by means of a spring 145 reacting between a flange 146 of the plunger and an abutment portion 147 of the sleeve 142. The receptacle carrying the measuring blocks is moved in time with the table 1 by means of a gear 150 fixed to the shaft 120 (see Figures 1, 4, and 10), which meshes through a pair of idler gears 151 and 152 with a gear 153 fixed to the Geneva wheel 10.

If desired, means for cutting off the supply of filling material may be provided. As shown in Figures 9 and 10, this means may comprise a plate-like lever 154 having a handle 155 by which it may be actuated, this lever being fulcrumed on the sleeve 125 and having an arm 156 movable beneath the opening 132 to close the same. This closure member is urged upwardly against the lower face of the plate 126 by means of a spring 157 bearing between it and a flange portion 158 on the bushing 125. If, for any reason, the die 45 when positioned beneath the opening 132 should not have a receptacle therein to receive the material ejected from the measuring block, this material falls through the die and is received by a chute 159 by which it is conducted to a box indicated at 160 in Figure 2.

*Receptacle closing mechanism.*

Figure 14:
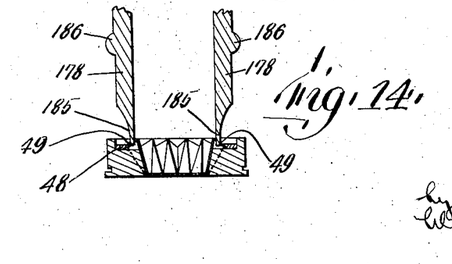
Figure 14 is a diagrammatic section showing the manner in which the closing fingers engage the package.

After the receptacle is filled it is passed to the station $e$ (Figures 3 and 5) at which point the package is closed. The closing mechanism is shown in detail in Figures 12, 13 and 14. At this station the bracket 170 is positioned adjacent the edge of the table 1 and has fixed to its inner side a horizontally extending bracket 171. This bracket is formed with a central perforation 172 and top and bottom plates 173 and 174 partly bridging this perforation. The upper plate 173 has a perforation 175 therein, the inner wall of which is tapered inwardly and upwardly and at its lower end is substantially the size of the perforation 172. The lower plate is shown in detail in Figure 13 and has a central perforation 176 from which extend radial slots 177, the number of these slots being equal to the number of projections 112 of the forming plunger shown in Figures 6 and 7, which is likewise equal to the number of reentrant angular portions of the receptacle side. These slots 177 form guideways for a series of folding fingers 178 which are fulcrumed at their upper end on a ring member 179 made fast between a sleeve 180 and a cover plate 181 which are bolted together, the ring 179 being seated in mating annular depressions in the collar and cover plate. The collar and cover plate are held in proper relative position by means of centering pins 182 and also passed therethrough is a stop pin 183 which may impinge on the upper face of the plate 173 to limit the downward movement of the folding fingers. These fingers have tapered ends 185 which are designed to pass within the reentrant angle portions of the containers which extend above the upper end of the forming ribs 46 in the members 45, as indicated in Figure 14, the outer angular portions of the containers being held beneath the flange 49 of the ring 48 therein. The fingers are then caused to move inwardly and downwardly to bring the reentrant portions toward the center of the receptacle in position to be folded down on the material therein as will be later described. For the purpose of giving inward motion to the fingers each finger is provided with a cam portion 186, which is engaged by the inner edge of the perforation 175 so as to rock the fingers inwardly simultaneously and then to permit the fingers to move outwardly and come to rest in the dotted line positions shown in Figure 12. In this position of the parts a plunger 190 having a shallow cup-shaped lower end is depressed against the inwardly folded margin of the receptacle and is rotated and pressed downwardly thereon to close the receptacle into the form shown in Figures 24 and 25. As shown in these figures the sheet margin is folded together and the folds laid down in overlapping circular series, the end portions of the folded edges overlapping each other to form a circular series of progressively overlapping sectors concentric with the disk as shown in dotted lines at 200 in Figure 24.

For the purpose of actuating the fingers and for rotating and depressing the plunger 190 the following mechanism has been provided. The collar 180 above mentioned is free to slide on a hollow stem 210 being keyed against rotation relatively thereto by means of a key 211 sliding in a slot 212 of the stem. This stem is slidable through a guide block 213 which is provided with a flange 214 overlying a perforated boss 215 of the crosshead 90, the block extending within the perforation and being fixed in position by centering pins 216 and cap screws 217. The stem 210 is permitted a limited sliding movement by a set screw 218 passing through a boss 219 extending upwardly from the block 213, the inner end of which set screw rides in a slot 220 in the stem 210. The stem 210 and the collar 180 are normally held in their extreme downward positions relative to the crosshead 90 by means of a coil spring 221 surrounding the stem and bearing at its lower end against the upper end of the collar 180 and at its upper end against the lower face of the block 213. The lower limit of motion of the collar 180 relative to the stem 210 is determined by a collar 222 threaded on the lower end of the stem and against which the plate 181 impinges. The lower end of the stem 210 has fixed therein a guide sleeve 223 and slidable therethrough is a rod 224 to the lower end of which the plunger 190 is made fast. The rod 224 extends through a guide bushing 225 at the upper end of the stem 210 and above this stem has fixed thereto a stop collar 226. The plunger together with the rod 224 is urged downwardly by a spring 227 surrounding rod 224 and bearing at its lower end on the top face of the plunger within an annular marginal flange 228 extending upwardly therefrom, and bearing at its upper end against the lower face of a washer 229 which overlaps the end of the bushing 223 and the lower end of the stem 210. The rod 224 is rotatable within the bushings 223 and 225 and for the purpose of rotating it a sleeve 230 is keyed thereto and carries at its lower end a sprocket wheel 231. This sleeve 230 is fixed for rotation in a bushing 232 carried by a sleeve 233 supported by a bracket 234 carried by the cross frame member 98, a stop collar 237 made fast to the upper end of the sleeve 230 retaining it in position. The sprocket wheel 231 is adapted to have passed thereabout a sprocket chain 235 (see Figures 1 and 3) which also passes over a sprocket wheel 236 fixed to the central shaft 11.

With this construction as the crosshead 90 descends the spring 221 acting on the upper end of the sleeve 180 causes the fingers to be resiliently depressed to enter between the sides of the reentrant folds of the receptacle and then to be moved inwardly as is shown in dotted lines in Figure 12. The stem 210 is also carried downwardly by engagement of the plate 181 on the collar 222 and then by screw 218 against the end of the slot 220, and the rotating plunger is also carried down resiliently by means of the spring 227 so that it engages the folded portions and turns or spins them down into overlapping relation as above described.

*Seal forming and applying mechanism.*

Figure 24:
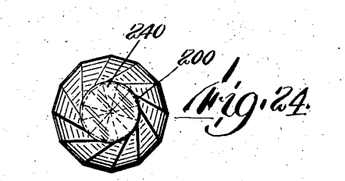
Figures 24 and 25 are similar views showing the package sealed and completed.
Figure 25:
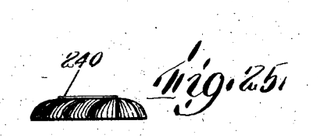

The next operation is performed at station *f* at which position a sealing wafer, preferably of paper gummed on one side, is made fast over the circular series of overlapping ends of the folded sections such as a wafer being indicated at 240 in Figures 24 and 25.

Referring to Figures 1 and 3, at 250 is shown a reel or spool for holding the strip of gummed paper. This reel is carried by an arm 251 bolted to the outer end of a bracket 252 extending from the machine frame. The strip of paper is led therefrom with its gummed side downward over a moistening pad shown at 253 in Figure 3. This pad is supplied with water through a pipe 254 leading from a water receptacle 255 also carried by the machine frame. After passing over the pad the sealing strip passes over a supporting roll 256 and across the table at right angles to the strip from which the receptacles are made and to station *f*. At this point the paper passes through a guide slot 260 (see Figure 15) in the lower face of a plunger block 261. To the lower face of this plunger block is made fast a die plate 262 having a die opening 263 therein having a marginal upwardly extending flange 264 projecting into the guide slot and against which the gummed face of the paper passes. This flange furnishes a narrow support for the gummed paper over which it may be drawn without too great an amount of sticking so that there is no danger of the paper being torn by resistance to its movement over the die plate. This plate is fixed in position on the plunger block by means of screws 265.

Figures 15, 16:
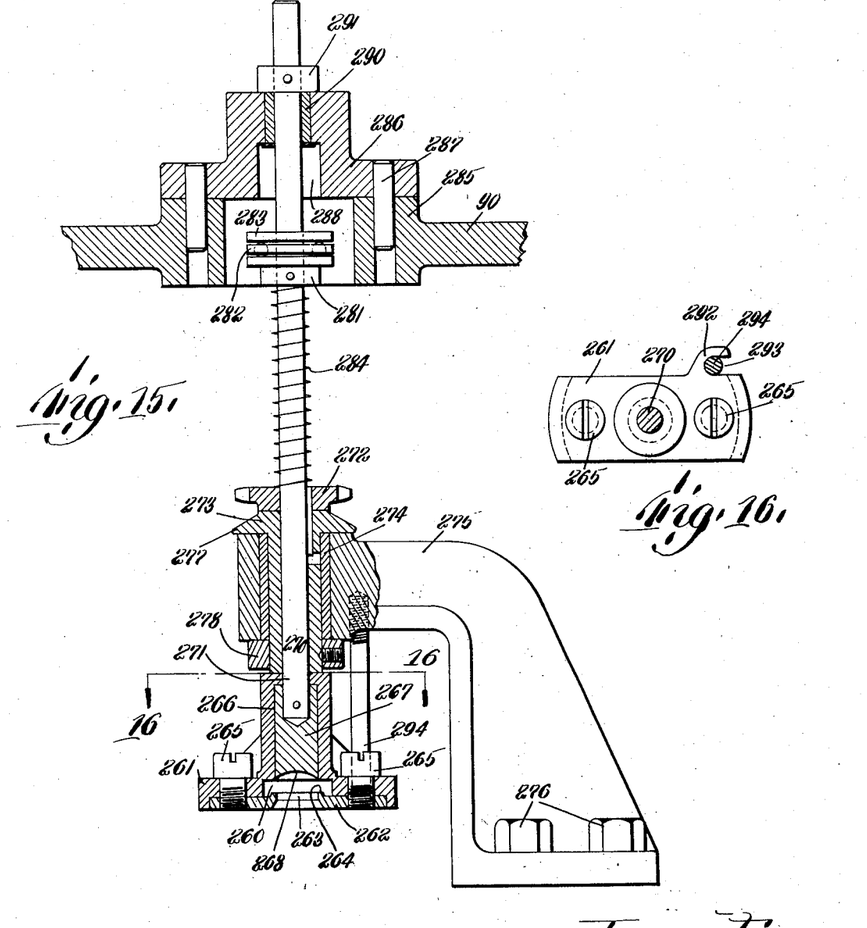
Figure 15 is a vertical section through the seal cutting and applying mechanism.
Figure 16 is a section on line 16—16 of Figure 15.

The plunger block has a central recess 266 therein in which is slidably mounted a punch 267. This punch has a lower preferably concave punching surface 268 to form cutting edges cooperating with the die opening 263. This punch is fixed to the lower end of a rod 270 which extends upwardly through an opening 271 in the top of the block 261. This rod 270 is of smaller diameter than the punch, the block 261 being supported by the upper end of the punch, so that on descent of the punch the block 261 is first lowered against the table 1, and on further motion of the punch it acts to punch out a disk of gummed material, force it through the die opening and into contact with the upper face of the closed receptacle or package.

If desired the punch may be rotated as well as reciprocated, and for this purpose a sprocket wheel 272 is shown as splined to the rod 270, this sprocket wheel being preferably fixed to a sleeve 273 journaled in a bushing 274 carried in a vertical perforation in the outer end of a supporting bracket 275 which is fixed by bolts 276 to the machine frame. This sleeve 273 is flanged at its upper end at 277 to overlap the upper end of the bearing, and fixed thereto beneath this bearing is a collar 278, the collar and the flange serving to prevent vertical motion of the sleeve and the sprocket wheel 272. This sprocket wheel may be driven, as shown, by means of a sprocket chain 280 passing over a suitable sprocket wheel on the shaft 11. The rod 270 extends upwardly above the sprocket wheel 272 and has fixed thereon a collar 281 which supports on its upper face a ball race 282 of a ball bearing, and resting on this ball bearing is a plate 283 through which the rod 270 passes. The collar 281 has bearing against its under side a spring 284 which also bears on the upper face of the sprocket wheel 272. The actuating crosshead 90 has a perforated boss 285 and fixed in place over the top of this boss is a cover plate 286, centering pins as 287 being employed to retain the cover plate in proper position. This cover plate has a central recess 288 but this is of such size that on depression of the crosshead 90 the cover plate 286 impinges on the marginal portion of the plate 283 so as to depress the rod 270, while on the raising of the crosshead 90 the spring 284 helps to raise the rod 270. This rod is journaled at its upper end in a bushing 290 fixed in a central perforation of the cover plate 286 and a collar 291 is fixed to the rod 270 above this plate. In order to prevent the block 261 from rotating with the rod 270, it is provided with an extension 292 at one side having a notch 293 through which slidably engages a guide pin 294, which is screwed into a perforation in the lower face of the bracket 275, this construction being best shown in Figure 16.

After passing through the guide slot 260, the gummed strip passes to an intermittent feeding mechanism having feed rolls shown at 295 in Figures 1 and 3. This feed mechanism may be of any suitable description and is not shown in detail herein. An arm 296 for actuating this feeding mechanism by the motion of crosshead 90 is shown extending outwardly from the crosshead 90 and having an operative connection thereto by means of a rod 297. In order that the gummed material may not stick to the feed rolls provision is made for supplying them with water, this comprising a tank 298 having a pipe connection 299 with a tank 300 in which the lower roll 295 dips.

After the wafer is placed in position the die containing the package moves to the station indicated at $g$ where the package is ejected from the die. The ejector mechanism has not been shown in detail since it comprises nothing more than a plunger shown at 310 in Figure 2, which is moved vertically by the crosshead 90, and in its descent impinges on and forces the filled and sealed receptacles out through an opening in the ring 35 where they drop into the upper end of a conveyor chute shown at 311 in Figures 3, 4, and 17. This chute leads the filled receptacles through a mechanism for pressing the sealing wafer into tight engagement with the package, thus insuring that the packages are properly sealed before the final operation.

*Seal pressing mechanism.*

Figures 17, 23:
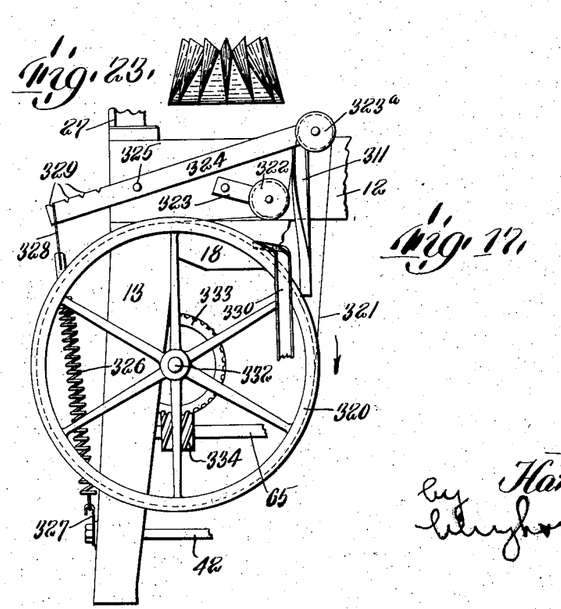
Figure 17 is a fragmentary side elevation of the seal pressing mechanism looking in the opposite direction of Figure 1.
Figures 22 and 23 are similar views showing the blank partially closed after having received its filling.
Figure 18:
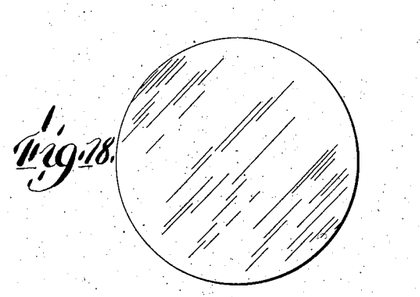
Figure 19:
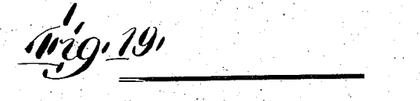

The pressing mechanism is shown in detail in Figure 17 and comprises a large belt pulley 320 which is flanged on opposite sides, as shown in Figure 2, to receive a belt 321 therebetween. This belt passes about an idler pulley 322 journaled on a bracket 323 extending from the machine frame, and over a small belt wheel 323ª carried at one end of a lever 324 fulcrumed at 325 on the machine frame, and having its opposite end engaged by a tension mechanism comprising a spring 326 engaging over a fixed hook 327 at its lower end, and having a yoke 328 fixed at its upper end engaging over and seated in any one of a plurality of notches 329 in one arm of the lever 324. The conveyor chute 311 leads to a point between the periphery of the belt wheel 320 and the belt where the belt 321 is moving into engagement with the wheel, the latter being driven, by mechanism later described, in the direction of the arrow in Figure 17. The conveyor chute 311 is also given a half twist, as shown, to present the side of the receptacle against which the sealing wafer has been placed facing the belt 321. As the wheel and belt move, therefore, they form a pair of traveling surfaces which are pressed together by means of the tension device 326, so that the sealing wafer is held in tight engagement with the receptacle as it passes about the periphery of the wheel 320 until it is released by the belt passing away from the wheel face, this being for a sufficient period of time to insure tight sealing. At this point the receptacles are guided into a conveyor chute 330 from which they pass away from the machine, the operation being complete. The wheel 320 is carried by a shaft 332 which has thereon a worm wheel 333 meshing with a worm 334 fixed to the shaft 65.

It will be noted from the above description that the several operations of blanking the sheet material, crimping the marginal edges of the blank, filling, closing, and applying the sealing wafers thereto are performed at each actuation of the crosshead 90. This crosshead is reciprocated vertically, being slidably guided in ways 400 in the bracket members 27 and is actuated by a pair of eccentrics 401 fixed to the shaft 24, eccentric rods 402 being shown actuated by these eccentrics and having pivotal connection with brackets 403 fixed to the crosshead 90.

Having thus described one embodiment of this invention it will be evident to those skilled in the art that many changes or modifications might be made therein without departing from its spirit or scope as defined by the appended claims.

I claim:

1. In a packaging machine, means for cutting a disk of sheet material, means for crimping the edge of said disk to form a receptacle, means for filling said receptacle, means for folding said crimped edge down over the filling, and means for sealing the receptacle.

2. In a packaging machine, means for cutting a disk of sheet material, means for crimping the edge of said disk to form a receptacle, means for filling said receptacle, means for folding said crimped edge down over the filling, and means for punching and sticking a sealing disk over said folded down portion to seal the package.

3. In a packaging machine, means for cutting a disk of sheet material, means for crimping the edge of said disk to form a receptacle, means for filling said receptacle, means for folding said crimped edge down over the filling, means for punching and sticking a sealing disk over said folded down portion to seal the package, and means for holding the receptacle sealed for a period of time.

4. In a packaging machine, means for cutting a disk of paper, means for forming a series of radially arranged folds facing in the same direction relative to its side faces about the margin of said disk and a series of oppositely facing folds extending from the inner end of each radial fold outwardly inclined in opposite directions to points intermediate the outer ends of said radial folds, whereby an upstanding zigzag marginal wall is formed about the unfolded central portion of said disk to form a receptacle, means for feeding material into said receptacle, means for closing together the marginal portion of said disk on said folds and laying the folded portions down on the material in rotational sequence to form the ends of said folded portions in circular progressively overlapping series, and means for applying a sealing wafer over the area of said circular series.

5. In a packaging machine, means for forming a series of radially arranged folds facing in the same direction relative to its side faces about the margin of a disk of sheet material and a series of oppositely facing folds extending from the inner end of each radial fold outwardly inclined in opposite directions to points intermediate the outer ends of said radial folds whereby an upstanding zigzag marginal wall is formed about the unfolded central portion of said disk to form a receptacle, means for feeding material into said receptacle, means for closing together the marginal portion of said disk on said folds and laying the folded portions down on the material in rotational sequence to form the ends of said folded portions in a circular progressively overlapping series, and means for applying a sealing wafer over the area of said circular series.

6. In a packaging machine, means for feeding a strip of paper, means for successively cutting disks from said strip, means for forming a series of radially arranged folds facing in the same direction relative to its side faces about the margin of each disk successively and a series of oppositely arranged folds extending from the inner end of each radial fold outwardly inclined in opposite directions to points intermediate the outer ends of said radial folds, whereby an upstanding zigzag marginal wall is formed about the unfolded central portion of the disk to form a receptacle, means for successively feeding material into said receptacles, means for closing together the marginal portion of each disk successively on its folds and laying the folded portions down on the material in rotational sequence to form the ends of said folded portions in a circular progressively overlapping series, means for feeding a strip of gummed paper over said folded ends, and means for progressively cutting off and affixing a portion from said gummed strip to cover and seal said circular series.

7. In a packaging machine, means for feeding a strip of paper, means for successively cutting disks from said strip, means for successively forming a series of radially arranged folds facing in the same direction relative to its side faces about the margin of each disk and a series of oppositely arranged folds extending from the inner end of each radial fold outwardly inclined in opposite directions to points intermediate the outer ends of said radial folds, whereby an upstanding zigzag marginal wall is formed about the unfolded central portion of said disk to form a receptacle, means for successively feeding material into said receptacles, means for closing together the marginal portion of each disk successively on its folds and laying the folded portions down on the material in rotational sequence to form the ends of said folded portions in a circular progressively overlapping series, means for feeding a strip of gummed paper over said folded ends, means for progressively cutting off and affixing a portion from said gummed strip to cover and seal said circular series, and means for pressing said portion into close engagement with said receptacle.

8. In a machine of the class described, means for bending the margin of a piece of sheet material alternately in opposite directions to form a receptacle with a marginal wall having a series of reentrant angle portions, means for supplying material within said receptacle, and means for folding the sides of said reentrant angle portions together and down upon said material to close said receptacle.

9. In a machine of the class described, means for bending the margin of a piece of sheet material alternately in opposite directions to form a receptacle with a marginal wall having a series of reentrant angle portions, means for supplying material within said container, means for folding the sides of said reentrant angle portions together and down upon said material to close said receptacle, and means to seal said receptacle closed.

10. In a machine of the class described, a female die having a series of angular ribs projecting inwardly therein, means for forcing a disk of sheet material therein to form a receptacle having an upstanding side wall having reentrant angle portions extending beyond the ends of said ribs, and means engageable in said extended portions of said reentrant angles and movable toward each other to close said side wall toward the central portion of said receptacles.

11. In a machine of the class described, means for closing a receptacle formed by crimping the margin of a piece of sheet material to form a side wall having a series of reentrant angle portions, which comprises a series of fingers engaging in said reentrant angle portions, means to move said fingers toward a position centrally thereof to partially close said receptacle, and means for engaging said reentrant portions to close them down in overlapping relation.

12. In a machine of the class described, means for closing a receptacle formed by crimping the margin of a disk of sheet material to form a side wall having a series of reentrant angle portions which comprises a circular series of fingers engaging outwardly of said reentrant angle portions, means to move said fingers while in such engagement toward a point centrally thereof, and a plunger for engaging said reentrant portions and forcing them toward the central portion of said disk.

13. In a machine of the class described, means for closing a receptacle formed by crimping the margin of a disk of sheet material to form a side wall having a series of reentrant angle portions which comprises a circular series of fingers engaging outwardly of said reentrant angle portions, means to move said fingers while in such engagement toward a point centrally thereof, a plunger for engaging said reentrant portions and forcing them toward the central portion of said disk, and means for rotating said plunger to cause said reentrant angle portions to be folded together in progressively overlapping relation.

In testimony whereof I have affixed my signature.

HANS H. WANDERS.